United States Patent [19]
Reinert et al.

[11] 3,775,786
[45] Dec. 4, 1973

[54] BIOLOGICAL PRODUCT AND PROCESS FOR TREATING AND RESTORING HONEYCOMBS INFECTED WITH BACILLUS LARVAE (AMERICAN FOULBROOD DISEASE)

[75] Inventors: Charles P. Reinert, Garvin; Samuel F. Tutt, Lake Wilson, both of Minn.

[73] Assignee: Winona Research, Inc., Winona, Minn.

[22] Filed: Feb. 14, 1972

[21] Appl. No.: 226,196

[52] U.S. Cl................................ 6/12 R, 260/239.1
[51] Int. Cl............................................. A01k 51/00
[58] Field of Search................................ 6/1, 11, 12; 260/239.1

[56] References Cited
UNITED STATES PATENTS
3,714,150  1/1973  Sellstedt et al. .................. 260/239.1
3,715,347  2/1973  Spry et al........................ 260/239.1

Primary Examiner—Robert Peshock
Assistant Examiner—D. L. Weinhold
Attorney—George F. Williamson et al.

[57] ABSTRACT

A biological product and process for treating and restoring honeycombs infected with American Foulbrood disease (Bacilus larvae) includes the steps of applying a solution of water and living Penicillin mold to a diseased honeycomb. The solution containing the Penicillin mold is applied to the honeycomb by dipping the honeycomb in the solution, or by spraying the solution onthe honeycomb so that substantially the entire surface of the honeycomb is contacted by the solution. The treated honeycomb is allowed to remain at room temperature (about 70° to 80°F.) for a period of time sufficient to permit good growth of the Penicillin mold so that the mold substantially covers the honeycomb. The treated honeycomb is then placed in a bee hive where the mold dries, and the scale and foreign matter is then easily and effectively removed by the bees so that each cell has a clean interior wax surface.

5 Claims, No Drawings

BIOLOGICAL PRODUCT AND PROCESS FOR TREATING AND RESTORING HONEYCOMBS INFECTED WITH BACILLUS LARVAE (AMERICAN FOULBROOD DISEASE)

SUMMARY OF THE INVENTION

One of the principal brood diseases of honeybees in American Foulbrood disease caused by *Bacillus larvae*, a spore-forming bacteria. American Foulbrood disease is difficult to treat although some states permit the use of tetracycline and sulfathiazole as aids in the control and prevention of the disease. However, it should be pointed out that neither tetracycline nor sulfathiazole kill spores of *Bacillus larvae*. Therefore, some states require that bees, contaminated honeycombs, and honey of infected colonies be destroyed by burning.

It is also felt that chemical treatment of AFB (American Foulbrood disease) has certain disadvantages. One such disadvantage is the possible contamination of the honey with the therapeutic chemical agent. In this regard, it should be pointed out that honey is one of the few natural food products that does not require processing or preparation steps of additives for human consumption.

Another disadvantage to the use of chemotherapy is the possible development of resistant strains of *Bacillus larvae*. Recent experience with broad spectrum antibiotics has clearly indicated the possible development of resistant strains of pathogens, especially with respect to the indiscriminate use of these drugs.

It is therefore a general object of this invention to provide a biological product and process for use in restoring honeycombs infected with American Foulbrood disease. In carrying out the novel process, the honeycomb infected with American Foulbrood disease has a water solution containing living Penicillin mold applied thereto, and the treated honeycomb is allowed to remain at room temperature for a period of time sufficient to permit good growth of the Penicillin mold so that it covers substantially the entire honeycomb. The growing mold actually penetrates the scale and lining of the cells of the honeycomb. The honeycomb is then placed in a bee hive where the mold dries out, and the bees completely remove the dried mold and scale material from the cells so as to restore the cells of the honeycomb to condition prior to the infection.

DETAILED DESCRIPTION OF THE INVENTION

In practicing the present invention, a honeycomb which has been contaminated with American Foulbrood disease is treated and is then placed in a healthy bee hive wherein the bees effectively and quickly clean and restore the honeycomb to substantially its original non-diseased condition. This is a biological approach to the problem of treating the infected honeycomb rather than the conventional chemotherapeutic approach.

American Foulbrood disease occurs throughout the world, and it has been estimated that approximately 5 percent of all the colonies inspected in the United States are found to be infected by this disease. The causative organism for American Foulbrood disease is *Bacillus larvae* which is a spore-forming bacteria.

There are certain chemotherapeutic agents, namely sulfathiazole and tetracycline which are effective when the *Bacillus larvae* organism is in its susceptible vegetative stage. However, as pointed out above, the use of chemotherapeutic agents presents the possibility of the occurrence of undesirable chemical residues in the honey, or possibly the development of resistant strains of *Bacillus larvae*. This biological control precludes the occurrence of either the chemical residue problem in the honey or the occurence of resistant *Bacillus larvae* strains.

The American Foulbrood disease is incited by the spores after they are ingested into the digestive track with the larval food. These spores germinate shortly after ingestion and the infected larvae eventually die. The honeybee larvae are susceptible to American Foulbrood disease only when the larvae are less than 3 days old. During the development of the honeybee larva, it elongates to substantially the full length of the brood cell, and it is in the elongated position that the larva or pupa dies. As the infection progresses, the larva or pupa changes from a healthy white appearance to a light brown and eventually to a dark brown appearance. The remains of the diseased larva or pupa finally dry out in the cell and form scales which adhere strongly to the inner surface of the cell.

In the present process, the infected honeycombs are removed from the hive or colony, and a solution containing living Penicillin mold is applied to the honeycomb. The solution containing the living Penicillin mold may be applied to the infected combs by spraying or by dipping the combs in the solution. The solution containing the living Penicillin mold contacts all the surfaces of the infected comb and the treated honeycombs are allowed to remain at room temperature and preferably in a damp environment to allow the mold to grow and develop until it covers substantially the entire surface of the honeycomb. This penicillin mold in its growth penetrates the scale material adhering to the cell walls. The treated honeycombs are then placed in a healthy bee hive and the bees very effectively remove the scale material.

In practicing the present invention, a solution containing Penicillin mold in distilled water is applied to the diseased honeycomb and an appropriate dilution has been found to be one to fifteen well developed colonies of mold per 200 to 400 milliliters of distilled water. It should be pointed out that although the particular species of the genus Penicillin mold has not been precisely determined, it is thought that the identity of the species has apparently been restricted to two isolates, *monoverticillata stricta* and an asymmetric group, related to *Penicillium crysogenofum* series.

The solution is applied to the diseased honeycomb so that it contacts and moistens the cell walls. The treated honeycomb is allowed to remain at approximately room temperature and preferably in a damp environment for a period of time to permit good growth of the mold. It has been found that the growth of the Penicillin mold will develop sufficiently to substantially cover the entire surface area of the treated comb in approximately 3 days. The comb is then placed in a well populated healthy hive and the bees very rapidly remove the dried scale and material from the cell walls.

When untreated combs are placed in the bee hive, the bees attempt to remove some of the scale material from the infected cells, but are only able to remove part of this scale material since it adheres so firmly to the cell wall. However, it has been observed that the bees appear to work much more carefully and fastidiously on the treated combs as compared to the untreated combs but this particular behavior of the bees cannot be presently explained.

It has further been observed that after the cells of the treated comb have been cleaned by the bees, the wax surfaces of the cells are less viable with respect to *Bacillus larvae* spores than honeycombs which have not been treated by the present process. This degree of cleaning by the bees with respect to the treated honeycombs substantially minimizes any change of reinfection of the honeycomb since the scale material which contains the infectious spores is removed.

Another important result of the present biological control is that the bees not only remove the scale material from the cells of the treated combs, but the bees also remove old cocoon residue from the cells. This old cocoon residue results from previous brood rearing and progressively reduces the size of the brood comb. This reduction in the cross-sectional area of the cells results in the evolvement of adult bees which are smaller in size as compared to broods reared in full size cells. Thus the present process permits restoration of the cells of the treated honeycomb to a condition substantially identical to a freshly drawn comb.

In this example, AFB (American Foulbrood disease) scale-infected combs, in the 500–1,000 scale per comb range were used as both experimental and control combs. An equal number of control combs were treated in the identical manner to the experimental combs, with the exception that the solution applied to the control combs contained no Penicillin mold.

In determining the viability of these diseased combs, samples were taken from the three areas on both sides of each comb. These samples were obtained by removing the entire bottom cell wall with a sterile forceps, and these samples were then placed in sterile vials, and 0.2 milliliters of sterile distilled water was then added. These samples were then macerated with a sterile glass rod and one loop of this sample inoculant was then transferred to a tube containing yeast-carrot-agar media which supports growth of the *Bacillus larvae*. This yeast-carrot-agar media also facilitates the nitrate reduction test which has been demonstrated to be an accurate test to show the presence of *Bacillus larvae*.

The culture tubes were then incubated at 37° C. for 6 days. A nitrate reduction test was conducted through the use of sulphanilic acid and alphanaphtylamine. In this test, the presence of nitrates produces a red color, and the test indicated that the combs used in the example were viable.

After it was determined that the control and experimental combs were viable, the experimental combs were then treated with a product containing genus Penicillium mold in a spore solution. In treating the experimental combs, the solution of Penicillin mold colonies in 200 milliliters of sterile, distilled water, adjusted to a PH of 4.5 was sprayed on each comb. Approximately half of the solution was applied to each side of the experimental comb. It is pointed out that the solution may also be applied by dipping the combs in the solution.

The solution contained sufficient Penicillin mold so that good growth of the mold was obtained in about three days. As pointed out above, an appropriate dilution to accomplish this growth has been found to be approximately one to fifteen well developed colonies of the Penicillin mold per 200–400 milliliters of sterile distilled water. This growth was allowed to develop during this three day period so that it completely covered the treated comb, the growth extending down into the cells of the comb and penetrating the scale material in these cells.

It was found that good growth of the mold occurred at room temperature (approximately 70°–80° F.), and preferably in a damp environment. The honeycombs used in these examples were placed in glass tanks containing water so that the damp conditions were maintained during the period of growth. It should be pointed out that a damp environment (relatively high humidity) is a desirable optimum condition, and merely affects the growth rate of the Penicillin mold. After the good growth of the mold was obtained, the combs were then placed in a queen right hive.

The control combs were also placed in the hive at the same time with the experimental comb. The solution applied to the control combs was comprised of sterile distilled water also adjusted to a PH of 4.5 in the manner of the experimental combs. Incubation for the control combs was the same and the control combs were placed symmetrically in the same hive with the experimental combs.

In this example, certain of the combs were inspected for the cleaning effect, other combs were checked for both cleaning affect and later brood development, and other combs checked for cleaning affect and viability (after a 3 day period).

The combs used in this example were checked daily and it was noted that within 2 days after placement in the hive, the combs treated with the Penicillin mold contained substantially no scale material. In this regard, it was only with difficulty that any scale material could be visually detected in any of the cells of the mold treated experimental combs. It appeared as though the Penicillin mold penetrated the scale material so that the scale material was decomposed by the living mold. There also appeared to be slight decomposition of the outer wax surface of the cell during growth of the mold. After the mold was placed in the hive, the mold quickly dried into a relatively thin white film.

It was further noted that this white film and scale was peeled from the cell walls by the bees as though this material was old dry skin, and this removal took place within a few days. It was noted that the cells of the experimental combs which were cleaned by the bees had a clean surface similar to that of a freshly drawn comb and none of the old cocoon residue was present which typically results from the previously reared brood.

However, the control combs retained practically all of the scale material and no noticeable removal of the scale material was observed. The cleaning affect was substantially identical with respect to all of the experimental honeycombs while each of the control honeycombs resulted in very little if any cleaning of the scale material therefrom.

With respect to later brood tests, it was noted that the experimental combs has 40 to 50 percent less infected brood as compared to the control combs. However, it should be pointed out that the experimental combs as well as the control combs were placed in the same hive and since the control combs retain substantially all of the original scale material, the control combs were therefore a heavy potential source of reinfection of the experimental combs by the adult bees.

The clean wax surfaces of the mold treated honeycombs showed substantially less viability (presence of *Bacillus larvae* spores) than the cells of the control combs. It was also noted that Penicillin mold apparently had no noticeable affect on the adult bees since these bees behaved normally and showed no signs of sickness or change in morale.

The use of the present process and product conditions the AFB infected honeycombs for such efficient cleaning by the bees that most of the infectious material is completely removed from the honeycombs. Further, the cleaning of the cells is so complete that even old cocoon remnants are removed from the cells. Therefore, not only does the present process and product permit treatment of diseased honeycombs so that reinfection by *Bacillus larvae* is minimized, but the present process and product also permits restoring of the cells of the honeycomb to their original size.

The success of the present biological product and process, however, depends on good growth of the Penicillin mold so that the mold growth penetrates the substrate scale material lining the cells. This biological control also eliminates the attendant dangers associated with chemotherapy, that is, the occurrence of undesirable chemical residues in the honey and the possible development of resistant strain pathogens.

From the foregoing, it will be seen that we have provided a novel biological product and process which is safe, effective, and reliable in treating and restoring honeycombs infected with American Foulbrood disease. While the present biological product and process does not cure American Foulbrood disease, the life cycle of the causative organism *Bacillus larvae* is so effectively interrupted so as to minimize reinfection by honeycombs treated with this process and product. Thus it will be seen that we have provided the only effective biological control in the treatment and restoration of honeycombs infected with American Foulbrood disease.

What is claimed is:

1. A process for restoring diseased honeybee combs infected with American Foulbrood, comprising
    applying a liquid solution containing living Penicillin mold to the cell wall surfaces of a hoenycomb infected with American Foulbrood,
    then allowing the honeycomb to remain at about room temperature for a period of time to permit growth of the Penicillin mold organism so that the Penicillin organism substantially covers the comb including the cell walls thereof,
    then placing the comb in a well populated bee hive whereby the Penicillin mold and scales are removed from the honeycomb cells by the bees.

2. The process as defined in claim 1 wherein said liquid solution is comprised of sterile, distilled water and living Pencillin mold, and having a PH of 4.5.

3. The process as defined in claim 1 wherein said solution is applied to the diseased comb by immersing the comb in said solution.

4. The process as defined in claim 1 wherein said solution is applied to the diseased comb by spraying the solution on said comb.

5. The process as defined in claim 1 wherein the honeycomb after the application of the solution thereto is allowed to remain at a temperature of about 70° to 80° F. for a period of time of about three days whereby growth of the Pencillin mold develops sufficiently to cover the comb and to penetrate the scales in the cells.

* * * * *